United States Patent
Terauchi et al.

(10) Patent No.: US 6,462,819 B1
(45) Date of Patent: Oct. 8, 2002

(54) LIGHT MEASURING APPARATUS AND COLORIMETER

(75) Inventors: Koichi Terauchi, Toyohashi; Eiji Kitagawa, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/503,718

(22) Filed: Feb. 14, 2000

(30) Foreign Application Priority Data

Feb. 15, 1999 (JP) ............................................ 11-035692
Oct. 15, 1999 (JP) ............................................ 11-293849

(51) Int. Cl.[7] ................................................. G01J 3/51
(52) U.S. Cl. ....................... 356/406; 356/407; 356/222; 356/225; 356/226; 250/226
(58) Field of Search .................................. 356/402, 405, 356/406, 407, 425, 218, 222, 225, 226; 250/226

(56) References Cited

U.S. PATENT DOCUMENTS

| 4,909,633 A | 3/1990 | Okui et al. .................. 356/405 |
| 5,589,934 A | 12/1996 | Hosoi et al. ................. 356/218 |

*Primary Examiner*—F. L. Evans
(74) *Attorney, Agent, or Firm*—McDermott, Will & Emery (57) ABSTRACT

In a light measuring apparatus, pulse-like measuring light is received by n photoelectric converting means and electric signals responsive to received light intensities are outputted therefrom. Time constant converting circuits elongate each of the electric signals in the direction of a time axis and outputs elongated electric signals. The respective levels of the elongated electric signals are detected at times different in width in the direction of the time axis. At this time, the timings with which the levels of n elongated electric signals are detected are shifted from each other. By using the result of detection, the respective integral values of the n elongated electric signals can be calculated without using integrating circuits. This reduces the number of components and the size and cost of a device.

19 Claims, 7 Drawing Sheets

LIGHT MEASURING APPARATUS AND COLORIMETER

This application is based on applications No. 11-35692 and No. 11-293849 filed in Japan, the contents of which are hereby incorporated by reference.

BACKGROUND OF THE INVENTION

1. Field of the Invention

The present invention relates to a light measuring apparatus and a calorimeter for measuring the spectral characteristics of pulse-like visible light, infrared light, or ultraviolet light, which are used in an illuminometer, an IR spectrophotometer, a UV spectrophotometer, an optical power meter, a luminancemeter, a photometer or the like.

2. Description of the Related Art

Figure 8:
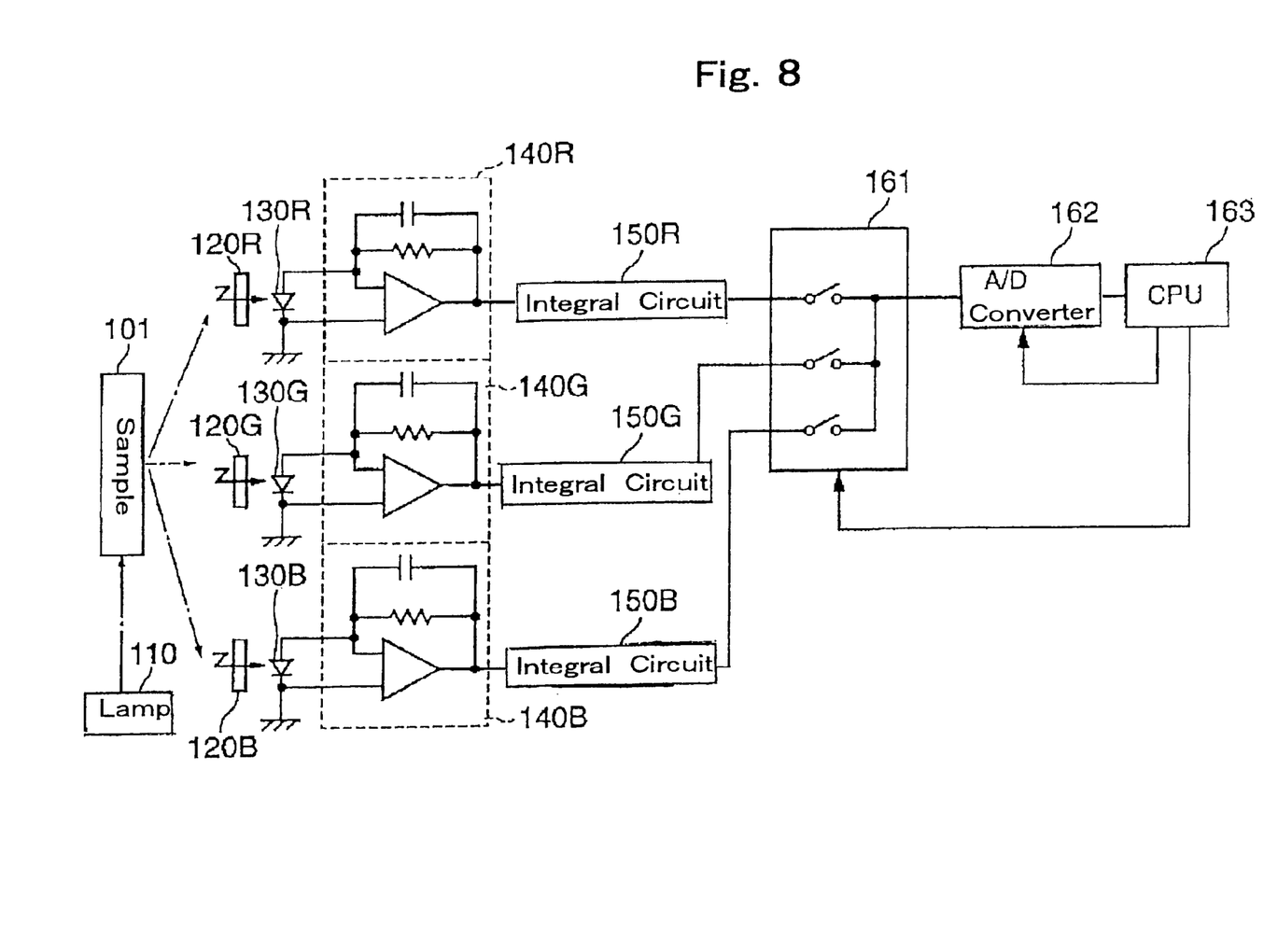
FIG. 8 is a block diagram showing an example of a conventional calorimeter.

There has conventionally been known a calorimeter as shown in FIG. 8. The calorimeter measures reflected light from a sample 101 under measurement when it is illuminated with a pulse beam outputted from a lamp 110. The reflected light from the sample 101 under measurement is branched to be transmitted by filters 120R, 120G, and 120B having different spectral sensitivities, received by photoelectric converting elements 130R, 130G, and 130B, such as photodiodes, and converted to current signals responsive to received light intensities. The current signals are converted to voltage signals by current-to-voltage converting circuits 140R, 140G, and 140B.

The voltage signals are charged and integrated in respective integrating circuits 150R, 150G, and 150B for a specified time and held as integral signals. The integral signals held are selected in turn by a multiplexer 161 and converted to digital values by an A/D converter 162 such that their signal levels are detected by a CPU 163.

When the sample under measurement is illuminated with the pulse beam from illuminating means in the calorimeter, it is difficult to completely block light other than the beam from the illuminating means. Accordingly, the light for illuminating the sample under measurement includes fixed light other than the pulse beam and offset. To remove the influence of such factors, there has been known a method of obtaining measurement data derived only from the pulse beam from the illuminating means and free from the influence of fixed light and offset by subtracting an output value of the A/D converter 162 resulting from the integral signal indicative of integration for the specified time, during which the pulse signal is not outputted from the illuminating means, from an output value of the A/D converter 162 resulting from the integral signal indicative of integration for the specified time including the time during which the pulse beam is outputted.

However, the conventional colorimeter shown in FIG. 8 requires one integrating circuit for one photoelectric converting element. If the number of photoelectric converting elements is increased to provide particular spectral characteristics, therefore, the number of integrating circuits is increased accordingly and the area occupied by the integrating circuits is also increased. This leads to the problem that a circuit board on which circuit components shown in FIG. 8 are mounted is increased in size.

To provide high-accuracy measurement data free from the influence of fixed light and offset by following the procedure described above, it is necessary to repeatedly perform, to the integrating circuit, operational control such as integration of the inputted voltage signal, retention of the obtained integral signal, and complete discharging of the integral signal, which causes the problem that complicated control should be performed with respect to the integrating circuit.

There has also been known a method of improving measurement accuracy in a conventional circuit as shown in FIG. 8, in which a signal level is held at a proper value by switching, during the charging of the integrating circuit, the capacitance of the capacitor of the integrating circuit or increasing or reducing a charging time based on variations in charging voltage within a specified time. However, the method also has the problem that complicated control should be performed with respect to the integrating circuit.

SUMMARY OF THE INVENTION

It is therefore an object of the present invention aiming at solving the foregoing problems to provide a light measuring apparatus and a colorimeter that can be reduced in size and price by obviating the necessity to provide an integrating circuit for pulse-like measuring light.

Another object of the present invention is to provide a light measuring apparatus and a calorimeter capable of performing high-accuracy measurement even in the case of obviating the necessity to provide an integrating circuit for pulse-like measuring light.

To attain the above objects, a light measuring apparatus in accordance with a first aspect of the present invention comprises: n (n is an integer equal to or more than 2) photoelectric converting elements for receiving pulse-like measuring light and outputting electric signals responsive to received light intensities; n time constant converting circuits provided to correspond to the n photoelectric converting elements, the time constant converting circuits outputting elongated electric signal obtained by elongating the electric signals outputted from the corresponding photoelectric converting elements in the direction of a time axis; a signal level detector for detecting the levels of the elongated electric signals at different times in the direction of the time axis; and an calculator for calculating respective integral values of the n elongated electric signals by using the result of detection from the signal level detector.

A light measuring apparatus in accordance with a second aspect of the present invention comprises: n (n is an integer equal to or more than 2) photoelectric converting elements for receiving pulse-like measuring light and outputting electric signals responsive to measured light intensities; n time constant converting circuits provided to correspond to the n photoelectric converting means, the time constant converting circuits outputting elongated electric signals obtained by elongating the electric signals outputted from the photoelectric converting elements in the direction of a time axis; a signal amplifier having m (m is an integer equal to or more than 2) selectable amplification factors, the signal amplifier outputting n amplified elongated electric signals obtained by amplifying each of the elongated electric signals with the selected one of the amplification factors; a signal level detector for detecting the levels of the amplified elongated electric signal at different times in the direction of the time axis; amplification factor setting means for setting a proper amplification factor selected from the m amplification factors based on the result of detection from the signal level detector; and a calculator for calculating respective integral values of the n amplified elongated electric signals by using the result of detection from the signal level detector.

A light measuring apparatus in accordance with a third aspect of the present invention comprises: a first photoelectric converting element for receiving pulse-like measuring light and outputting a first electric signal; a second photoelectric converting element for receiving the pulse-like measuring light and outputting a second electric signal; a first time constant converting circuit provided to correspond to the first photoelectric converting element, the first time constant converting circuit outputting a first elongated electric signal obtained by elongating the first electric signal in the direction of a time axis; a second time constant converting circuit provided to correspond to the second photoelectric converting element, the second time constant converting circuit outputting a second elongated electric signal obtained by elongating the second electric signal in the direction of the time axis; and a calculation controller for sampling, a plurality of times, each of the first and second elongated electric signals at given time intervals and calculating respective integral values of the first and second elongated electric signals by using plural sets of sampling data.

In an embodiment, a colorimeter having the light measuring apparatus in accordance with the first, second, or third aspect is shown by way of example. The calorimeter comprises: an illumination lamp for outputting a pulse beam for the illumination of a sample under measurement; and an optical member for dividing a light beam from the sample under measurement into n light beams having-different characteristics. The pulse beam outputted from the sample under measurement when the sample under measurement is illuminated with the pulse beam from the illuminating lamp is divided into n beams such that the beams having different spectral characteristics are received as measuring light by the corresponding photometric converting elements.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 2($a$) is a waveform chart showing an example of a light signal received by a photodiode and FIG. 2($b$) is a waveform chart showing an example of a voltage signal elongated in the direction of the time axis by a current-to-voltage converting circuit;

DESCRIPTION OF THE PREFERRED EMBODIMENTS

Figure 1:
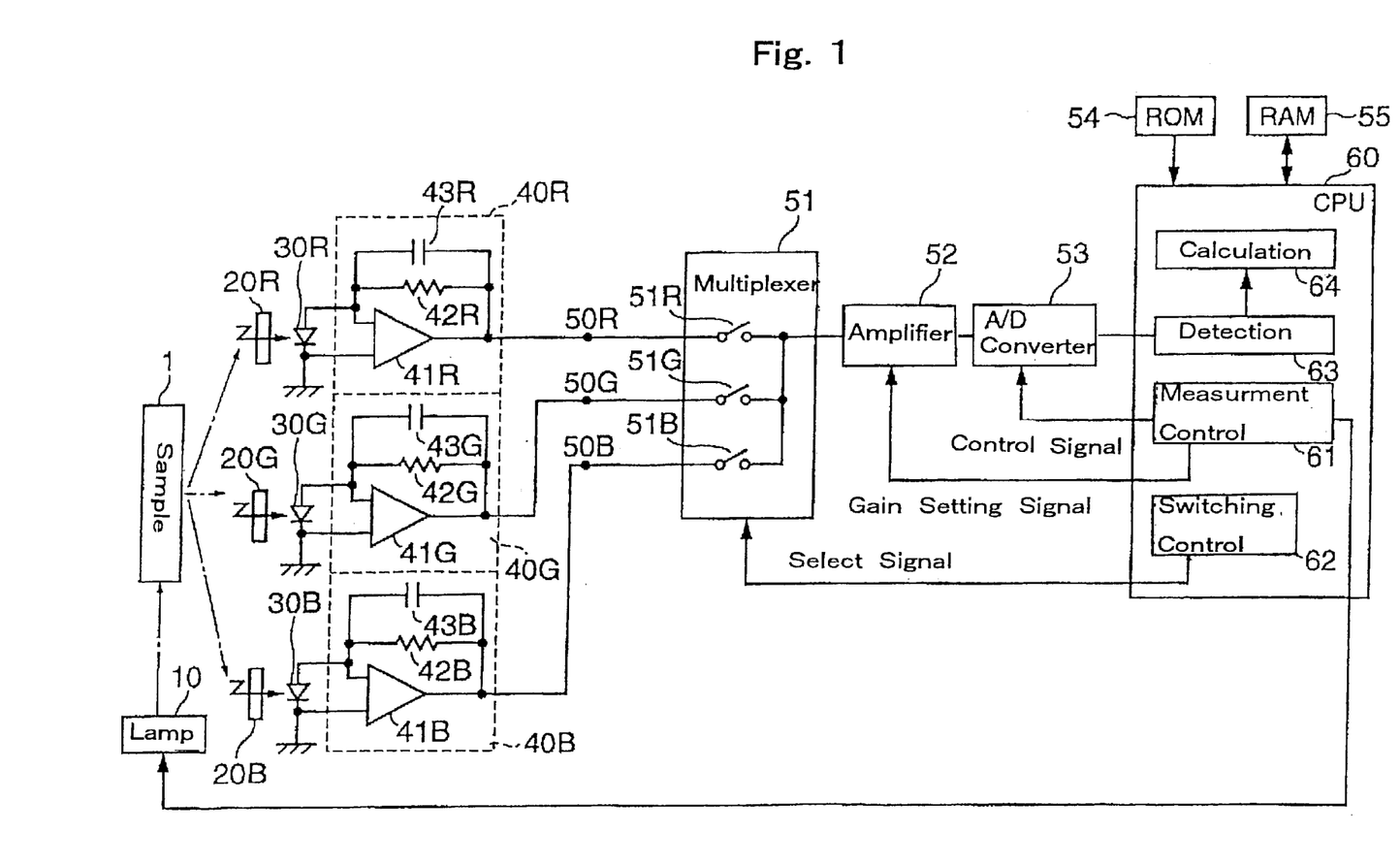
FIG. 1 is a block diagram of a colorimeter according to a first embodiment of the present invention.

FIG. 1 is a block diagram of a calorimeter according to a first embodiment of the present invention. As shown in FIG. 1, the calorimeter comprises: a lamp (illuminating member) 10; filters 20R, 20G, and 20B; photodiodes (photoelectric converting sensors) 30R, 30G, and 30B; current-to-voltage converting circuits (time constant converting circuits) 40R, 40G, and 40B; a multiplexer (selector) 51; an amplifier 52; an A/D converter 53; a ROM 54; a RAM 55; and a CPU 60 to perform a calorimetric operation with respect to a sample 1 under measurement.

As the lamp 10 for outputting a pulse beam, a Xe lamp, e.g., is used. The filters 20R, 20G, and 20B have different spectral sensitivities. For example, the filter 20R transmits visible light in the red wavelength range, the filter 20G transmits visible light in the green wavelength, and the filter 20B transmits visible light in the blue wavelength range.

The photodiodes 30R, 30G, and 30B are photoelectric converting elements for outputting current signals on levels responsive to received light intensities.

When the sample under measurement 1 is illuminated with the light beam from the lamp 10, the reflected light from the sample 1 under measurement is branched such that the branched light beams pass through the respective filters 20R, 20G, and 20B to be incident upon the respective photodiodes 30R, 30G, and 30B.

The current-to-voltage converting circuit 40R is composed of an amplifier 41R, a resistor 42R, and a capacitor 43R and converts a current signal outputted from the photodiode 30R to a voltage signal. At this time, the time constant of a time constant circuit composed of the resistor 42R and the capacitor 43R has been set to a desired large value.

Each of the current-to-voltage converting circuits 40G and 40B is configured similarly to the current-to-voltage converting circuit 40R. That is, the current-to-voltage converting circuit 40G is composed of an amplifier 41G, a resistor 42G, and a capacitor 43G. The current-to-voltage converting circuit 40B is composed of an amplifier 41B, a resistor 42B, and a capacitor 43B. The current-to-voltage converting circuits 40G and 40B convert respective current signals outputted from the photodiodes 30G and 30B to voltage signals. The time constant of a time constant circuit composed of the resistor 42G and the capacitor 43G and the time constant of a time constant circuit composed of the resistor 42B and the capacitor 43B have been set to desired large values.

The multiplexer 51 comprises respective switches 51R, 51G, and 51B corresponding to the current-to-voltage converting circuits 40R, 40G, and 40B. The multiplexer 51 is for selecting one from the voltage signals inputted thereto from the current-to-voltage converting circuits 40R, 40G, and 40B and outputting the selected voltage signal.

The amplifier 52 is for amplifying the voltage signal inputted thereto with a gain that has been set. The A/D converter 53 is for converting an analog voltage signal inputted thereto to a digital value. The ROM 54 is for storing predetermined data and a control program for the CPU 60. The RAM 55 is for temporarily storing detected measurement data.

The CPU 60 controls the operation of the colorimeter. If the control operation performed by the CPU 60 is represented in functional blocks, a measurement control block 61, a switching control block 62, a detection block 63, and a calculation block 64 are provided.

The measurement control block 61 has the following functions:

(1) the function of controlling light emission from the lamp 10;

(2) the function of outputting a gain setting signal for setting the gain of the amplifier 52. The gain to be set has been predetermined in accordance with the selected one of the switches 51R, 51G, and 51B of the multiplexer 51.

(3) the function of outputting a control signal for controlling the converting operation of the A/D converter 53.

The switch control block 62 has the function of outputting a select signal indicative of that one of the switches 51R, 51G, and 51B of the multiplexer 51 to be turned ON. As will be described later, the switch control block 62 outputs the select signal such that the switches are selected in rotation at given periods. The detection block 63 is for detecting, based on the digital value outputted from the A/D converter 53, the level thereof.

The calculation block 64 has the following functions.

(1) the function of calculating the integral values of the voltage signals outputted from the current-to-voltage converting circuits 40R, 40G, and 40B by using the result of detection from the detection block 63, which will be described later.

(2) the function of calculating measurement data derived only from the pulse beam from the lamp 10, which will be described later.

(3) the function of determining the color values of the sample 1 under measurement by using the calculated integral values.

The multiplexer 51, the switch control block 62, and the detection block 63 constitute a signal level detection block.

Figure 2A:
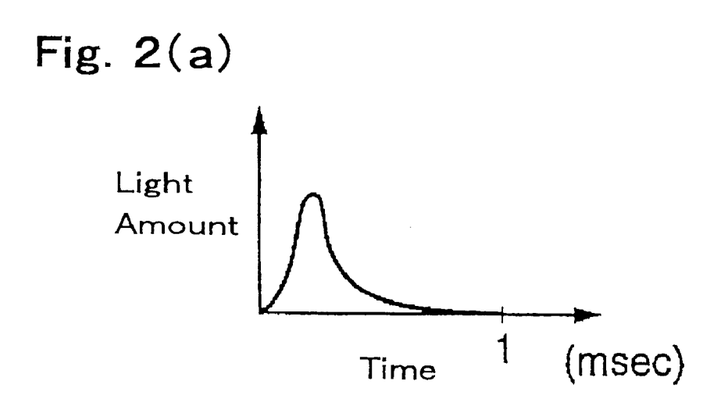
Figure 2B:
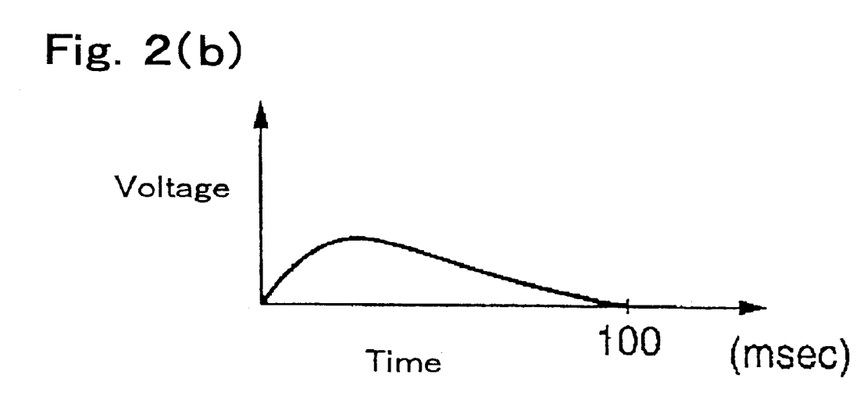
Figure 3:
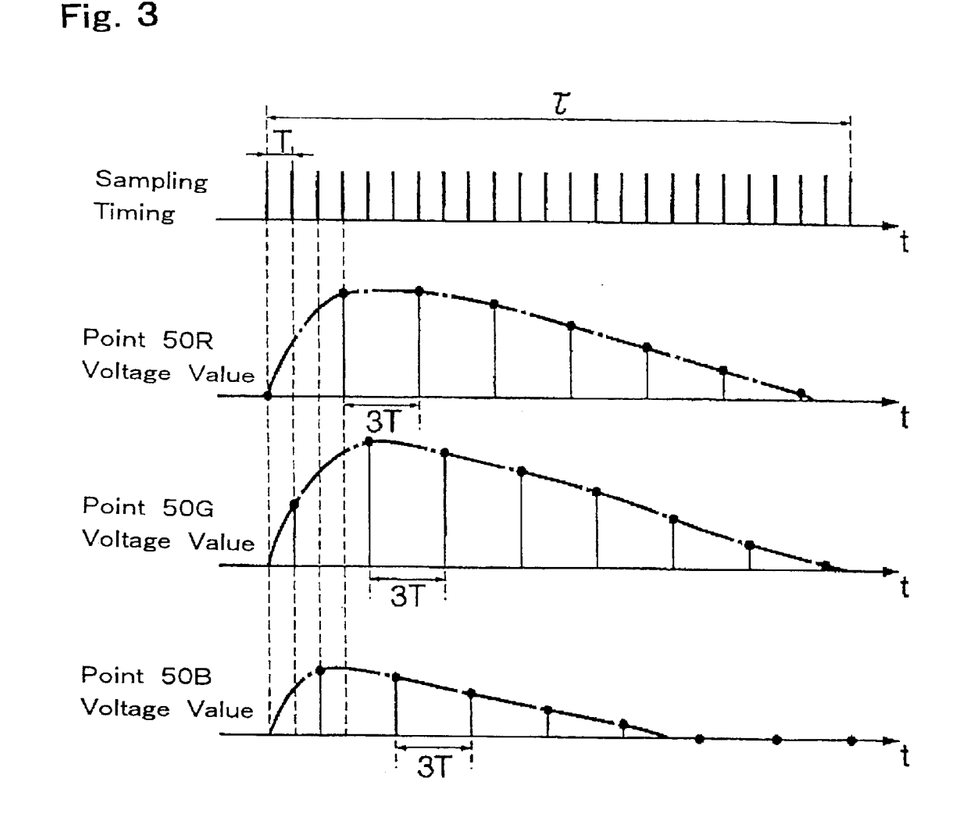
FIG. 3 is a view showing the timing for signal detection performed by detecting means of the first embodiment.

Next, a description will be given to the operation of the calorimeter with reference to FIGS. 2 and 3. FIG. 2(a) is a waveform chart showing an example of the light signal received by any one of the photodiodes 30R, 30G, and 30B. FIG. 2(b) is a waveform chart showing an example of the voltage signal elongated in the direction of the time axis by any one of the current-to-voltage converting circuits 40R, 40G, and 40B. FIG. 3 is a view showing the timing of signal detection performed by the detection block. In FIG. 3, the points 50R, 50G, and 50B correspond to the respective output points of the current-to-voltage converting circuits 40R, 40G, and 40B.

The measurement control block 61 causes the lamp 10 to output a pulse beam for the illumination of the sample 1 under measurement 1. The reflected light from the sample 1 under measurement is branched such that the branched beams are transmitted by the respective filters 20R, 20G, and 20B and received by the respective photodiodes 30R, 30G, and 30B. The light receiving time for each of the photodiodes 30R, 30G, and 30B with the pulse beam from the lamp 10 is, e.g., about 1 msec in the first embodiment, as shown in FIG. 2(a).

Subsequently, the received light signals are converted to current signals by the photodiodes 30R, 30G, and 30B, which are further converted to voltage signals by the current-to-voltage converting circuits 40R, 40G, and 40B. The voltage signals form gently sloped waveforms each elongated in the direction of the time axis (elongated electric signals). The output time for the voltage signal outputted from each of the current-to-voltage converting circuits 40R, 40G, and 40B has been elongated to, e.g., about 100 msec in the first embodiment, as shown in FIG. 2(b).

Simultaneously with or immediately after the emission of light from the lamp 10, the switch 51R of the multiplexer 51 is turned ON so that the voltage signal at the point 50R is selected first. At the same time, the voltage signal amplified with the gain set to the predetermined value is obtained from the amplifier 51. The signal is subjected to A/D conversion performed by the A/D converter 53. The digital signal obtained is loaded into the detection block 63 of the CPU 60 so that the level thereof is detected. The result of detection is stored as measurement data in the RAM 55.

Thereafter, the switches 51R, 51G, and 51B of the multiplexer 51 are successively turned ON in rotation at given sampling periods. As a result, the voltage signals at the points 50R, 50G, and 50B are selected in rotation and subjected to A/D conversion so that the levels of the digital signals obtained are detected by the detection block 63 and stored as measurement data in the RAM 55. The operation is continued till a prescribed time elapses.

Thus, as shown in FIG. 3, the voltage values of the voltage signals at the points 50R, 50G, and 50B indicated by the dash-dot curves which are designated at the solid circles ● are stored as measurement data in the RAM 55 at intervals T of timed samplings (sampling periods). Accordingly, measurement data based on the voltage value at each of the points 50R, 50G, 50B is obtainable at periods 3T till the prescribed time τ elapses.

The sampling period T has been adjusted to be equal to or slightly longer than the time required by the A/D converter 53 to perform A/D conversion (e.g., 30 μsec in the first embodiment). On the other hand, the prescribed timer has been adjusted to be equal to or slightly longer than the width (e.g., about 100 msec in the first embodiment as shown in FIG. 2(b)) in the direction of the time axis of the voltage signal (elongated electric signal) outputted from each of the current-to-voltage converting circuits 40R, 40G, and 40B. Accordingly, the total number of samplings becomes (100 msec)/30 μsec) =3333 and the number of samplings at each of the points 50R, 50G, and 50B becomes 3333/3=1111.

Figure 4:
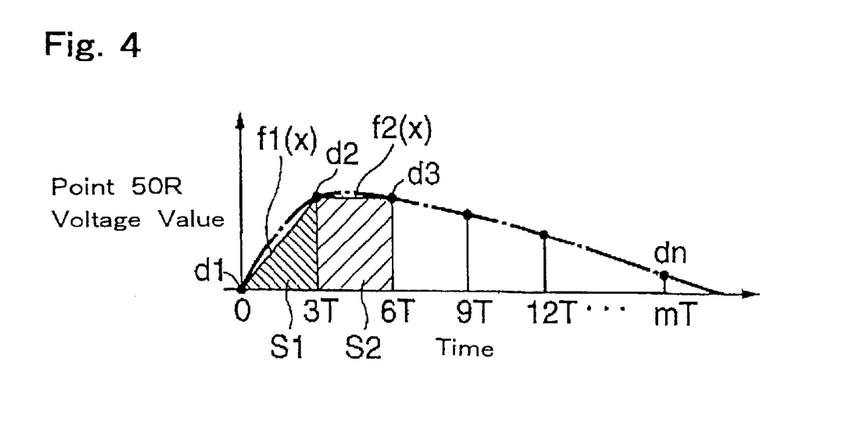
FIG. 4 is a view illustrating the calculation of an integral value.

Next, the calculation of an integral value performed by the calculation block 64 will be described with reference to FIG. 4. FIG. 4 is a view for illustrating the calculation of the integral value of the voltage signal at the point 50R.

First, a function f1(x) is obtained by using measurement data d1 and d2 such that the area S1 in the section of 0 to 3T is calculated by using the following equation (1).

$$S1 = \int f1(x)dx \tag{1}$$

Next, a function f2(x) is obtained by using measurement data d2 and d3 such that the area S2 in the section of 3T to 6T is calculated by using the following equation (2).

$$S2 = \int fs(x)dx \tag{2}$$

By thus calculating the area in each section till the final measurement data dn is used, the integral value S of the voltage signal can be calculated by using the following equation (3).

$$S = S1 + S2 + \ldots \tag{3}$$

By performing the same calculation by using the measurement data obtained at the points 50G and 50B, the integral values of the respective voltage signals at the points 50G and 50B can be obtained.

It is to be noted that the first embodiment has linearly approximated the voltage signals by using measurement data obtained at two points so that the functions f1(x), f2(x), . . . are expressed as linear equations.

Thus, according to the first embodiment, the elongated electric signals are generated by elongating, in the direction of the time axis, the signals responsive to the received light intensities, samplings are performed at given periods each sufficiently smaller than the width in the direction of the time axis of each of the elongated electric signals, and the areas are calculated by using measurement data obtained from the samplings. This enables the calculation of the integral values of the electric signals without using integrating circuits, reduces the number of components of an electric circuit composing the calorimeter and the size and cost thereof.

Since samplings have been performed at periods T each of which is sufficiently smaller than the width in the direction of the time axis of each of the elongated electric signals, the detection of the levels of the elongated electric signals is performed with a higher frequency than that of variations in signal level. This enables high-accuracy calculation of the integral values.

Figure 5:
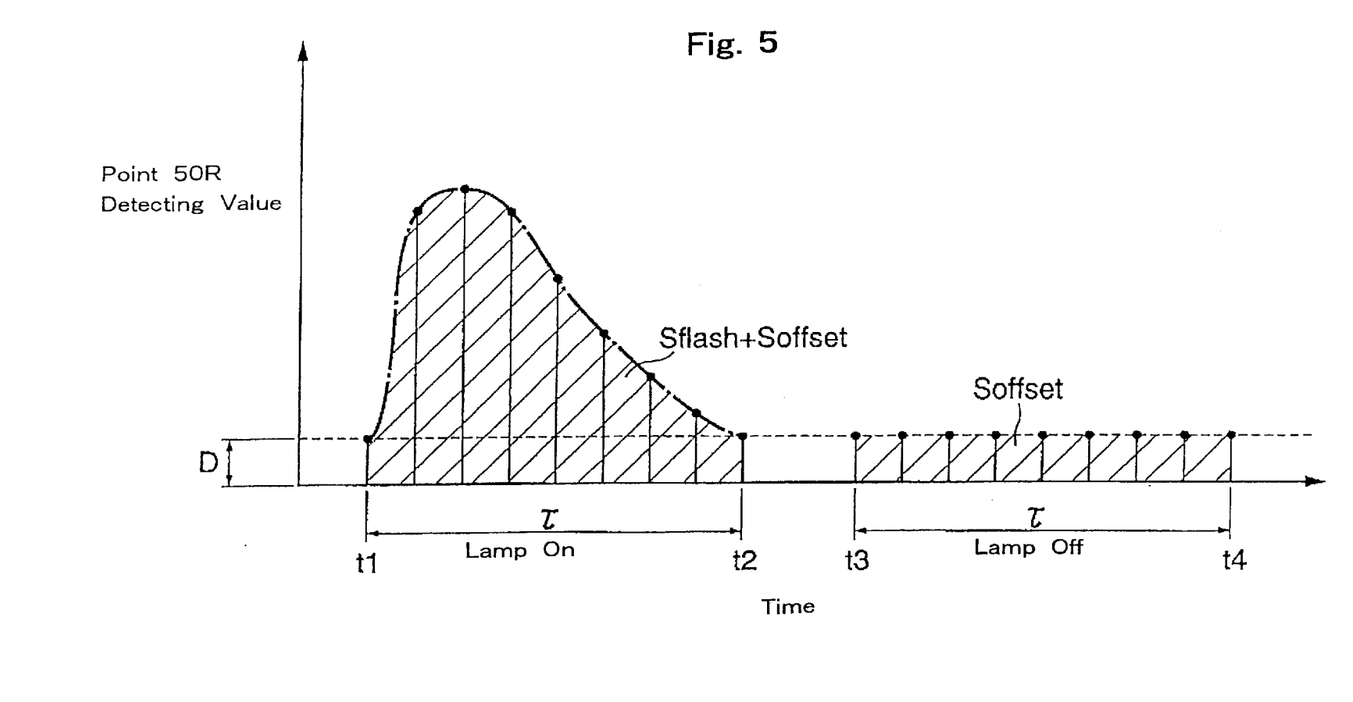
FIG. 5 is a view for illustrating the removal of the influence of offset.

Next, a description will be given to the removal of the influence of fixed light and offset with reference to FIG. 5. FIG. 5 is a view for illustrating the removal of the influence. In the drawing, the dash-dot curve represents the voltage signal at the point 50R. The solid circles represent measurement data detected by the detection block 63. The hatched portions represent areas.

In general, the respective amplifiers 41R, 41G, and 41B composing the current-to-voltage converting circuit 40R, 40G, and 40B and the amplifier 52 for setting the gain have offsets. If the blocking of light other than the light from the lamp 10 is insufficient, on the other hand, the illuminating light for the sample 1 under measurement includes a fixed light component. Under the influence of offset and fixed light, the measurement data detected by the detection block 63 shows a value elevated by a deviation D, as shown in FIG. 5.

Therefore, the first embodiment has removed the influence of offset and fixed light by calculating the deviation D. Specifically, the area is calculated in accordance with the foregoing procedure by causing the lamp 10 to emit light in the prescribed time τ between the times t1 and t2. Likewise, the area is calculated in accordance with the foregoing procedure by operating the individual components without causing the lamp 10 to emit light in the prescribed time τ between the times t3 and t4.

Hence, the area S' in the prescribed time τ between the times t1 and t2 becomes $$S' = (S\text{flash} + S\text{offset}) \quad (4)$$

where Sflash is the area derived from the pulse beam from the lamp 10 and Soffset is the area derived from offset and fixed light.

On the other hand, the area S in the prescribed time τ between the times t3 and t4 becomes $$S = S\text{offset}. \quad (5)$$

Therefore, the area Sflash derived from the pulse beam from the lamp 10 can be calculated by causing the calculation block 64 to perform the subtraction of $$S\text{flash} = S' - S \quad (6)$$

whereby the integral value of the measurement data derived only from the pulse beam from the lamp 10 is calculated.

Thus, according to the first embodiment, it becomes possible to obtain high-accuracy measurement data derived only from the pulse beam from the lamp 10 and free from the influence of offset and fixed light by subtracting, from the integral value when the lamp 10 is caused to emit light, the integral value calculated from measurement data obtained by performing the same operation for the prescribed time τ without causing the lamp 10 to emit light.

Figure 6:
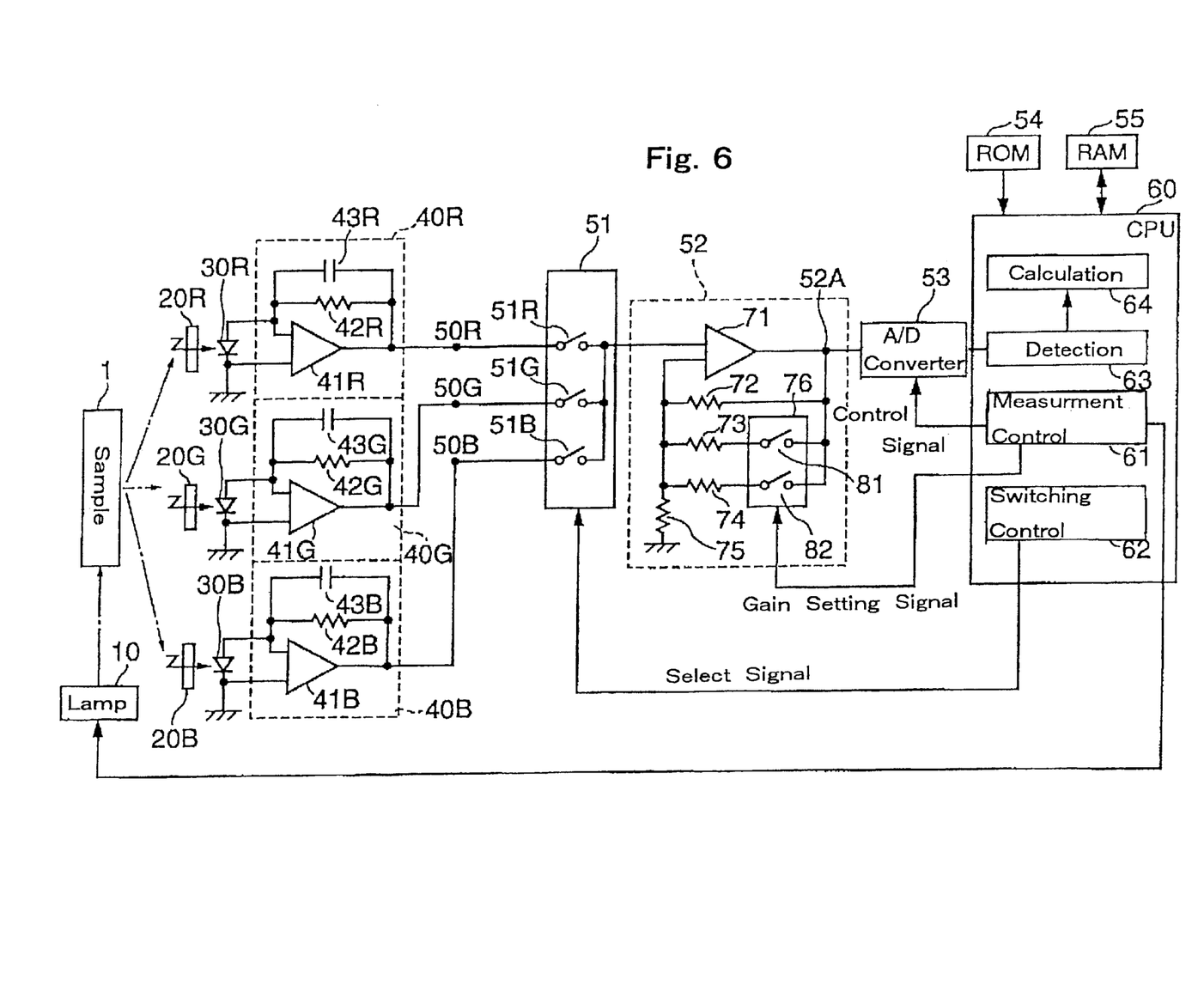
FIG. 6 is a block diagram of a calorimeter according to a second embodiment of the present invention.

FIG. 6 is a block diagram of a calorimeter according to a second embodiment of the present invention. In FIG. 6, the same components as used in FIG. 1 are designated by the same reference numerals. Hereinafter, the description will be given to the components other than those used in the first embodiment.

As shown in FIG. 6, an amplifier 52 in the calorimeter of the second embodiment is composed of an amplifying circuit comprising: an amplifier 71; resistors 72, 73, 74, and 75; and an analog switch 76. The analog switch 76 comprises respective switches 81 and 82 corresponding to the resistors 73 and 74. The amplifier 52 is for amplifying an input voltage signal with m (m=4 in the present embodiment) amplification factors determined by combinations of the ON-OFF states of the switches 81 and 82 and composes signal amplifying means.

A ROM 54 stores, as preset data, them m (m=4 in the present embodiment) amplification factors that can be set in the amplifier 52, an initial amplification factor (which will be described later), and a circuit saturation voltage (i.e., the maximum voltage level that can be measured in the circuit of FIG. 6).

A measurement control block 61 is for controlling the respective ON-OFF states of the switches 81 and 82 of the analog switch 76 with a gain setting signal outputted therefrom. The amplification factor of the amplifier 52 is set by turning ON or OFF the switches 81 and 82. A calculation block 64 is for calculating a proper amplification factor for a voltage signal outputted from each of current-to-voltage converting circuits 40R, 40G, and 40B based on the result of measurement from the detection block 63, which will be described later. The measurement control block 61 and the calculation block 64 constitute amplification factor setting means.

Figure 7:
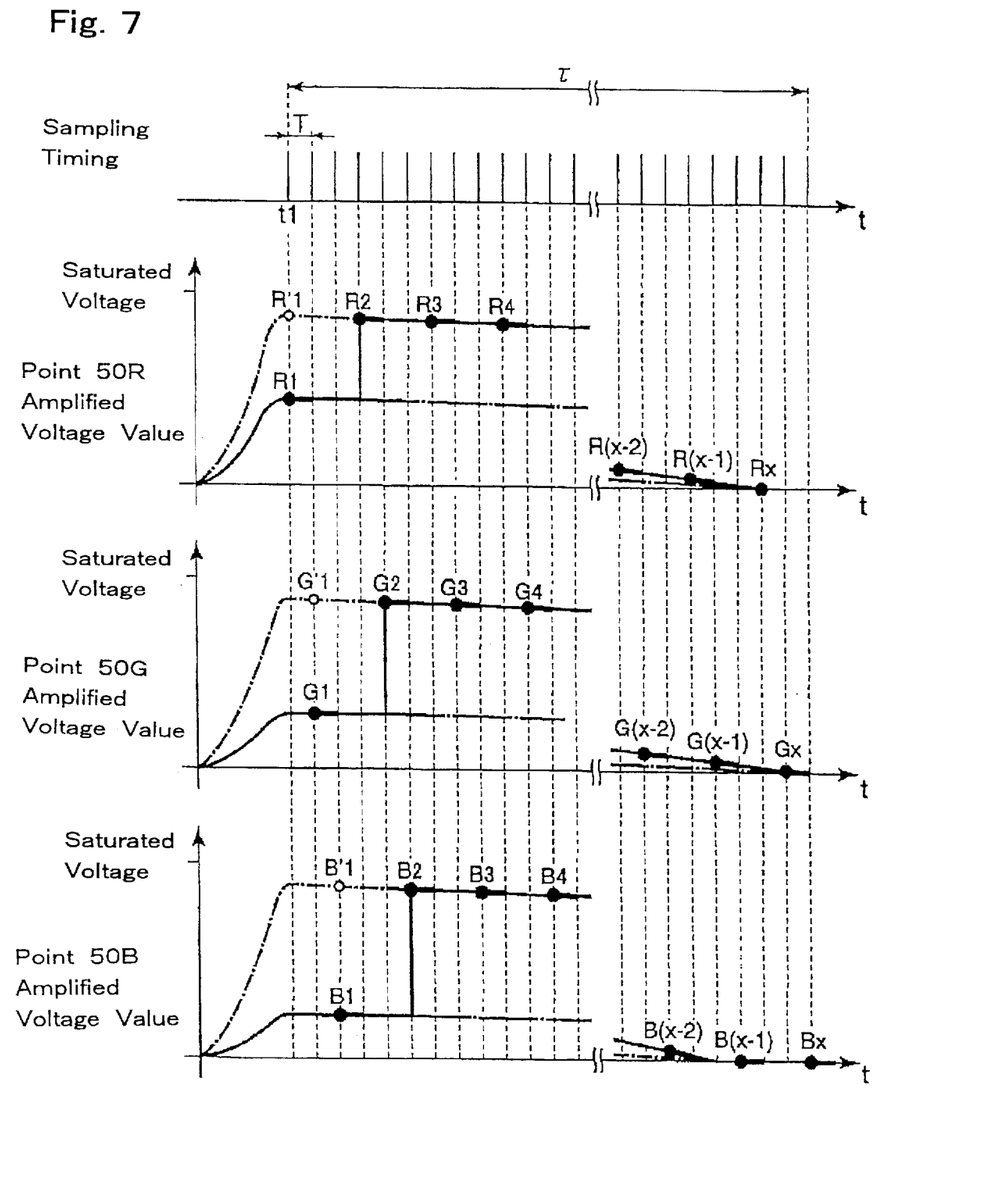
FIG. 7 is a view showing the timing for signal detection performed by detecting means of the second embodiment.

Next, a description will be given to the operation of the calorimeter of the second embodiment. FIG. 7 is a view showing the timing for signal detection performed by the detection block 63 of the second embodiment.

In FIG. 7, the amplified voltage values at the points 50R, 50G, and 50B are the voltage values at the point 52A (FIG. 6), which is the output point of the amplifier 52. In FIG. 7, respective voltage waveforms at the point 52A (FIG. 6) when each of the switches 51R, 51G, and 51B of the multiplexer 51 is in the ON state are indicated by the fine solid curves, while voltage waveforms actually obtained by switching the multiplexer 51 are indicated by the thick curves.

The measurement control block 61 causes the lamp 10 to output a pulse beam for the illumination of a sample 1 under measurement. The reflected light from the sample 1 under measurement is branched such that the branched light beams are transmitted by respective filters 20R, 20G, and 20B and received by respective photodiodes 30R, 30G, and 30B. The light-receiving time for each of the photodiodes 30R, 30G, and 30B with the pulse beam from the lamp 10 is, e.g., about 1 msec in the second embodiment, as shown in FIG. 2(a), similarly to the first embodiment.

Subsequently, the received light signals are converted to current signals by the photodiodes 30R, 30G, and 30B, which are further converted to voltage signals by the current-to-voltage converting circuits 40R, 40G, and 40B. The voltage signals form gently sloped waveforms each elongated in the direction of the time axis (elongated electric signals). The output time for the voltage signal outputted from each of the current-to-voltage converting circuits 40R, 40G, and 40B has been elongated to, e.g., about 100 msec in the second embodiment, as shown in FIG. 2(b), similarly to the first embodiment. The time at which the voltage signal reaches the maximum value is nearly constant irrespective of the quantity of the received light signals, which is, e.g., about 200 μsec after the initiation of light emission from the lamp 10.

Simultaneously with or immediately after the time at which the voltage signal becomes maximum after the initiation of light emission from the lamp 10 (which is, e.g., about 200 μsec in the second embodiment), the switch 51R of the multiplexer 51 is turned ON so that the voltage signal at the point 50R is selected first.

At the same time, the amplification factor of the amplifier 52 is set to the predetermined initial amplification factor. The initial amplification factor has been set to such a value as to ensure the obtention of all measurement data within a predetermined range which is measurable with the colorimeter. In the second embodiment, for example, the initial amplification factor has been set to a value such that an output voltage from the amplifier 52 is under the circuit saturation voltage even when the reflected light from the sample 1 under measurement is maximum within the measurable range.

The voltage signal amplified with the initial amplification factor is subjected to A/D conversion performed by a A/D converter 53. The digital signal obtained is loaded into the detection block 63 of a CPU 60 so that the level thereof is detected. The result of detection is stored as measurement data R1 in a RAM 55.

Subsequently, the switches 51G and 51B of the multiplexer 51 are successively turned ON at given sampling periods, whereby the respective voltage signals at the points 50G and 50B are selected. The selected voltages are amplified with the initial amplification factors respectively set and the amplified voltage signals are subjected to A/D conversion. The levels of the digital signals obtained are detected by the detection block 63 and stored as measurement data G1 and B1 in the RAM 55.

By using the measurement data R1, G1, and B1 derived from the respective voltage signals, the m (m=4 in the present embodiment) amplification factors that can be set in the amplifier 52, and the circuit saturation voltage, the proper amplification factor with which the voltage signal reaches the maximum level lower than the circuit saturation voltage can be determined by the calculation block 64.

Then, the switch 51R of the multiplexer 51 is turned ON to select the voltage signal at the point 50R such that the proper amplification factor is set as the amplification factor of the amplifier 52 by the measurement control block 61. The voltage signal amplified with the proper amplification factor is subjected to A/D conversion performed by the A/D converter 53 and the digital value obtained is loaded into the CPU 60 so that the level thereof is detected. The result of detection is stored as measurement data in the RAM 55.

Thereafter, the switches 51R, 51G, and 51B of the multiplexer 51 are successively turned ON in rotation at given sampling periods. As a result, the voltage signals at the points 50R, 50G, and 50B are amplified with the respective proper amplification factors and the amplified voltage signals are selected in rotation and subjected to A/D conversion so that the levels of the digital signals obtained are detected by the detection block 63 and stored as measurement data in the RAM 55. The operation is continued till a prescribed time elapses.

Thus, as shown in FIG. 7, the voltage values of the voltage signals at the point 52A indicated by the thick solid curves which are designated at the solid circles ● are stored as measurement data in the RAM 55 at intervals T of timed samplings (sampling periods). Specifically, the voltage values R1, R2, R(x−1), and Rx, the voltage values G1, G2, ..., G(x−1), and Gx, and the voltage values B1, B2, ..., B(x−1), and Bx are stored in the RAM 55 (e.g., x=1111 in the present embodiment). Accordingly, measurement data based on the amplified voltage value at each of the points 50R, 50G, 50B is obtainable at periods 3T till the prescribed time τ elapses.

The sampling period T has been adjusted to be equal to or slightly longer than the time required by the A/D converter 53 to perform A/D conversion (e.g., 30 μsec in the second embodiment), similarly to the first embodiment. On the other hand, the prescribed time τ has been adjusted to be equal to or slightly longer than the width (e.g., about 100 msec in the second embodiment as shown in FIG. 2(b), similarly to the first embodiment) in the direction of the time axis of the voltage signal (elongated electric signal) outputted from each of the current-to-voltage converting circuits 40R, 40G, and 40B, similarly to the first embodiment.

Accordingly, the total number of samplings becomes (100 msec)/30 μsec)=3333, similarly to the first embodiment. The number of samplings at each of the points 50R, 50G, and 50B becomes 3333/3=1111, so that the number of samplings with the proper amplification factor becomes 1111−1=1110.

Next, the calculation of an integral value performed by the calculation block 64 in the second embodiment will be described with reference to FIG. 7.

First, the voltage value R1 designated at the hollow circle is calculated with the proper amplification factor by using the measurement data R1 at the time t1 and the following equation (7).

$$R1 = R1 \cdot Gr/Gi \quad (7)$$

where Gr is the proper amplification factor and Gi is an initial amplification factor.

By using the voltage value R1 and the measurement data R2 to Rx, the integral value Sr of the amplified voltage signal resulting from amplification with the proper amplification factor can be calculated in accordance with the method described with reference to FIG. 4 and by using the foregoing equations (1) to (3), similarly to the first embodiment.

By performing the same calculation by using the measurement data obtained at the points 50G and 50B, the integral values of the amplified voltage signals at the points 50G and 50B resulting from amplification with the proper amplification factors can be calculated.

Thus, according to the second embodiment, the elongated electric signals are generated by elongating, in the direction of the time axis, the signals responsive to the received light intensities, samplings are performed at given periods each of which is sufficiently smaller than the width in the direction of the time axis of each of the elongated electric signals, the proper amplification factors are calculated by using the measurement data obtained from the samplings while the elongated electric signals are outputted, and the amplified elongated electric signals are generated by amplifying the elongated electric signals with the proper amplification factors. This allows each of the electric signals to be increased to the proper level. As a result, output noise in the amplifier 52 and an absolute conversion error in the A/D converter 53 can be reduced relatively, which allows amplified elongated electric signals each having an improved S/N ratio to be outputted.

Since the integral values of the amplified elongated electric signals at the points 50R, 50G, and 50B are calculated by using the result of detection, the calculation accuracy can be increased with the increased levels of the electric signals. Consequently, the integral values each having a much improved S/N ratio can be calculated even when the sample 1 under measurement has low reflectance. Since the color values are calculated from the integral values, the measurement accuracy of the calorimeter can be increased.

Since samplings have been performed at periods T each of which is sufficiently smaller than the width in the direction of the time axis of each of the elongated electric signals, the detection of the levels of the amplified elongated electric signals is performed with a higher frequency than that of variations in signal level. This enables high-accuracy calculation of the integral values.

By reducing the time elapsed till the setting of the proper amplification factors, compared with the width of the elongated electric signal in the direction of the time axis, i.e., by turning ON the switch 51R of the multiplexer 51 simultaneously with or immediately after the time at which the voltage signal becomes maximum after the initiation of light emission from the lamp 10 and calculating the proper amplification factors upon the initial turning ON of the switches 51R, 51G, and 51B, the number of times that the levels of the amplified elongated electric signals resulting from amplification with the proper amplification factors are detected is increased. This enables higher-accuracy calculation of the integral values and therefore higher-accuracy calorimetric operation.

In addition, the integral values of the electric signals can be calculated without using integrating circuits, similarly to the first embodiment. This reduces the number of components of an electric circuit composing the colorimeter and the size and cost thereof.

Next, a description will be given to the removal of the influence of fixed light and offset in the second embodiment.

As described in the first embodiment, measurement data detected by the detection block 63 shows a value elevated by the deviation D under the influence of offset and fixed light. In the second embodiment, the deviation D includes a deviation D1 resulting from the initial amplification factor and a deviation D2 resulting from the proper amplification factor.

Therefore, the second embodiment has calculated the deviation D1 resulting from the initial amplification factor by operating the individual components without causing the lamp 10 to emit light in the initial prescribed time $\tau$, calculated the area (integral value) in accordance with the foregoing procedure by causing the lamp 10 to emit light, and calculated the deviation D2 resulting from the proper amplification factor by operating the individual components without causing the lamp 10 to emit light in the subsequent prescribed time $\tau$. By thus switching the deviations based on the amplification factor of the measurement value, the present embodiment has removed the influence of offset and fixed light.

Thus, according to the second embodiment, the integral values resulting from the initial amplification factor and from the proper amplification factor are calculated from the measurement data obtained by performing the same operation for the period of the prescribed time $\tau$ with each of the amplification factors without causing the lamp 10 to emit light and the deviations D1 and D2 are calculated and subtracted from the integral values when light is emitted from the lamp 10. This provides high-accuracy measurement data derived only from the pulse beam from the lamp 10 and free from the influence of offset and fixed light.

It is to be noted that the present invention is not limited to the foregoing first and second embodiments and is applicable to the following variations.

(1) Although the first and second embodiments have approximated the signal waveforms by using the functions f1(x), f2(x), . . . as linear equations, the present invention is not limited thereto. The approximation may also be performed by using measurement data obtained at three or more points and polynomials.

(2) Although the switching control block 62 has performed selection at the multiplexer 51 such that samplings performed successively at the points 50R, 50G, and 50B in rotation are timed at given intervals T in the first and second embodiments, the present invention is not limited thereto. For example, if the interval T between the timed samplings varies slightly, an error is prevented from increasing if the interval T is sufficiently smaller than the prescribed time $\tau$. Even if selection at the multiplexer 51 is such that samplings are performed at the points 50R, 50G, and 50B not in rotation but at random, the error is prevented from increasing provided that the points 50R, 50G, and 50B are selected with equal frequencies.

(3) Although measurement is performed first in the presence of light emission from the lamp 10 and then in the absence of light emission from the lamp 10 in the first embodiment, as shown in FIG. 5, the present invention is not limited thereto. Conversely, measurement may also be performed first in the absence of light emission from the lamp 10 and then in the presence of light emission from the lamp 10.

Alternatively, measurement may also be performed sequentially in the absence of light emission from the lamp 10, in the presence of light emission from the lamp 10, and then in the absence of light emission from the lamp 10 such that a mean value is used as the area in the absence of light emission from the lamp 10.

(4) Although the first embodiment has subtracted the area in the absence of light emission from the lamp 10 from the area in the presence of light emission from the lamp as shown in FIG. 5 and in the equation (6), the present invention is not limited thereto. It is also possible to designate, as the deviation D, one single detected value or the mean value of a plurality of detected values in the absence of light emission from the lamp 10, subtract the deviation D from the detected value in the presence of light emission from the lamp 10, use the obtained value as measurement data, and calculate the area derived only from the pulse beam from the lamp 10 by using the measurement data.

Alternatively, the value detected at any one of the points 50R, 50G, and 50B can be designated as a common deviation D if the voltage values at the points 50R, 50G, and 50B in the absence of light emission from the lamp 10 are on the same level.

(5) Although the second embodiment has performed the calculation and setting of the proper amplification factors only once during measurement in the presence of light emission from the lamp 10, the present invention is not limited thereto. The calculation and setting of the proper amplification factors may also be performed a plurality of times.

(6) Although the second embodiment has calculated the integral value Sr based on the proper amplification factor Gr by correcting the measurement data R1, G1, and B1 obtained with the initial amplification factor Gi to provide the voltage values R1, G1, and B1 based on the proper amplification factor Gr and calculated the color values by using the integral value Sr, the present invention is not limited thereto.

It is also possible to, e.g., calculate an integral value Si based on the initial amplification factor Gi by using the equation (8) derived from the equation (7):

$$Si = Sr \cdot Gi/Gr \qquad (8)$$

and calculate the color values by using the integral value Si.

Alternatively, it is also possible to calculate the integral value by using the measurement data R2 to Rx, G2 to Gx, and B2 to Bx obtained with the proper amplification factor Gr, calculate the integral value based on the initial amplification factor Gi from the calculated integral value, and calculate an integral value to which the measurement data R1, G1, and B1 obtained with the initial amplification factor Gi has been added.

(7) Although the filters 20R, 20G, and 20B for transmitting visible light in the red, green, and blue wavelength ranges are provided in the first and second embodiments, the present invention is not limited thereto. Instead, there may also be used filters having spectral sensitivities corresponding to the CIE tristimulus values X, Y, and Z. The number of the filters is not limited to three. There may also be provided a large number of filters having spectral sensitivities the center wavelengths of which are different by a given wavelength width, e.g., 10 or 20 nm from those of the adjacent filters. Instead of the filters, a diffraction grating may also be provided as light dividing means.

(8) Although the first and second embodiments have been described by applying the present invention to the calorimeters each performing a colorimetric operation with respect to the sample 1 under measurement, the present invention is not limited thereto and is applicable to a light measuring apparatus for measuring the spectral characteristics of pulse-like visible light, IR light, UV light, or the like, which is used in an illuminometer, an IR spectrophotometer, a UV spectrophotometer, an optical power meter, a luminancemeter, or the like. In this case, for example, the lamp 10 may be used as an object under measurement instead of the sample 1 under measurement in FIG. 1 or 6.

As described above, according to the configurations of the embodiments, pulse-like measuring light is received by n photoelectric converting means and electric signals responsive to received light intensities are outputted therefrom. Time constant converting means elongates each of the electric signals in the direction of a time axis and outputs elongated electric signals. The respective levels of the elongated electric signals are detected at times different in width in the direction of the time axis. At this time, the timings with which the levels of n elongated electric signals are detected are shifted from each other. By using the result of detection, the respective integral values of the n elongated electric signals can be calculated without using integrating circuits. This reduces the number of components and the size and cost of a device.

If the interval between the times at which signal levels are detected is adjusted to be smaller than the width in the direction of the time axis of each of the elongated electric signals, the detection of the levels of the elongated electric signals is performed with a higher frequency than that of variations in signal level. This allows high-accuracy calculation of the integral value.

Of the n electric signals inputted from the n time constant converting means, one elongated electric signal is selected and outputted by the switching means. Selection by the switching means is performed in rotation at given periods and the level of the elongated electric signal outputted from the switching means is detected. This allows reliable detection of the level of one of the elongated electric signals outputted from the n time constant converting means to be performed in rotation at specified periods with a simple structure.

According to the embodiments, dark electric signals which are electric signals responsive to received light intensities when measuring light is not outputted are outputted. Each of the dark electric signals is elongated in the direction of the time axis so that elongated dark electric signals are outputted. Of n elongated dark electric signals, the level of at least one elongated dark electric signal is detected and a deviation resulting from a factor other than the measuring light is calculated by using the result of detecting the level of the elongated dark electric signal. The integral values of the n elongated electric signals derived only from the measuring light are calculated by using the deviation and the result of detecting the levels of the n elongated electric signals.

Alternatively, it is also possible to detect each of the n elongated dark electric signals once and subtract, from each of the results of detecting the levels of the n elongated electric signals at specified periods, the detected value as the deviation resulting from the factor other than the measuring light such as fixed light or the offset of an electric signal and calculate the integral values of the n elongated electric signals by using the results of subtraction.

Alternatively, it is also possible to detect the n elongated dark electric signals a plurality of times and designate a mean value as the deviation. It is also possible to detect the level of any one of the n elongated dark electric signals and designate the detected value as n common deviations resulting from a factor other than the measuring light, such as fixed light or the offset of an electric signal.

This allows the calculation of the integral values of the n elongated electric signals derived only from the measuring light and free from the influence of a factor other than the measuring light, such as fixed light or the offset of an electric signal, resulting in high-accuracy measurement.

In the structure of the second embodiment, the pulse-like measuring light is received by the n photoelectric converting means and respective electric signals responsive to received light intensities are outputted. Each of the electric signals is elongated by the time constant converting means in the direction of the time axis so that elongated electric signals are outputted. Each of the elongated electric signals is amplified by signal amplifying means with a specified initial amplification factor selected from m amplification factors so that amplified elongated electric signals are outputted. The levels of the amplified elongated electric signals are detected at times different in width in the direction of the time axis. At this time, the timings with which the levels of the n amplified elongated electric signals are detected are shifted from each other.

By calculating the respective integral values of the n amplified elongated electric signals by using the results of detection, the integral values can be calculated without using integrating circuits. This reduces the number of components and the size and cost of a device.

While the n elongated electric signals are outputted, the setting of the amplification factor is switched at least once from the initial amplification factor to the proper amplification factor, which is not smaller than the initial amplification factor, based on the result of detection from the signal level detecting means. This increases the levels of the amplified elongated electric signals and relatively reduces output noise from the signal amplifying means, so that the amplified elongated electric signals each having an improved S/N ratio are outputted. Since the absolute values of the levels of the amplified elongated electric signals are increased, accuracy with which the integral values of the n amplified elongated electric signals are calculated is increased. When the reflected light from the sample under measurement is used as the measuring light, therefore, the integral values with improved S/N ratios can be obtained even if the sample under measurement has low reflectance, which increases measurement accuracy.

If the interval between the times at which the signal levels are detected is reduced, compared with the width in the direction of the time axis of each of the elongated electric signals, the levels of the amplified elongated electric signals are detected with a higher frequency than that of variations in signals level, so that the calculation of the integral values are performed with high accuracy. If the time elapsed till the setting of the amplification factor is switched is further reduced, compared with the width in the direction of the time axis of each of the elongated electric signals, the number of times that the amplified elongated electric signals resulting from amplification with the proper amplification factor are detected is increased, so that the calculation of the integral values thereof is performed with higher accuracy.

In the structure of the second embodiment, the dark electric signals which are electric signals responsive to the received light intensities when the measuring light is not outputted are further outputted. The dark electric signals are elongated in the direction of the time axis, so that the elongated dark electric signals are outputted. Of the n amplified elongated dark electric signals resulting from amplification with at least one of the initial amplification factor and the proper amplification factor, the level of at least one amplified elongated dark electric signal is detected at least once.

By using the result of detecting the level of the amplified elongated dark electric signal, the deviation resulting from a factor other than the measuring light is calculated. The integral values of the n amplified elongated electric signals derived only from the measuring light are calculated by using the deviation and the result of detecting the levels of the n amplified elongated electric signals.

Alternatively, it is also possible to detect, once, each of the amplified elongated dark electric signals obtained by amplifying the n elongated dark electric signals with either one of the initial amplification factor and the proper amplification factor, subtract the detected value as the deviation resulting from a factor other than the measuring light, such as fixed light or the offset of an electric signal, from the result of detecting the levels of the n amplified elongated electric signals, and calculate the integral values of the n amplified elongated electric signals by using the result of subtraction.

Alternatively, it is also possible to detect, a plurality of times, each of the amplified elongated dark electric signals obtained by amplifying the n elongated dark electric signals with either one of the initial amplification factor and the proper amplification factor and designate a mean value as the deviation. It is also possible to detect the amplified elongated dark electric signals obtained by amplifying the n elongated dark electric signals with each of the initial amplification factor and the proper amplification factor and designate a mean value as the deviation.

Alternatively, it is also possible to detect the level of the amplified elongated dark electric signal obtained by amplifying any one of the n elongated dark electric signals with either one of the initial amplification factor and the proper amplification factor and designate the detected value as n common deviations resulting from a factor other than the measuring light, such as fixed light or the offset of an electric signal. It is also possible to detect the levels of the amplified elongated dark electric signals obtained by amplifying any one of the n elongated dark electric signals with each of the initial amplification factor and the proper amplification factor and designate the mean value of the detected values as n common deviations.

Alternatively, it is also possible to subtract the detected values of the n amplified elongated electric signals resulting from amplification with the initial amplification factor from the result of detecting those of the n amplified elongated electric signals resulting from amplification with the initial amplification factor, subtract the detected values of the n amplified elongated electric signals resulting from amplification with the proper amplification factor from the result of detecting the signals resulting from amplification with the proper amplification factor, and calculate the integral values of the n amplified elongated electric signals by using the results of subtraction.

This allows high-accuracy calculation of the integral values of the n amplified elongated electric signals derived only from the measuring light and free from the influence of a factor other than the measuring light, such as fixed light or the offset of an electric signal.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A light measuring apparatus comprising:
    n (n is an integer equal to or more than 2) photoelectric converting elements for receiving pulse-like measuring light and outputting electric signals responsive to received light intensities;
    n time constant converting circuits provided to correspond to the n photoelectric converting elements, the time constant converting circuits outputting elongated electric signal obtained by elongating the electric signals outputted from the corresponding photoelectric converting elements in the direction of a time axis;
    a signal level detector for detecting the levels of the elongated electric signals at different times in the direction of the time axis; and
    a calculator for calculating respective integral values of the n elongated electric signals by using the result of detection from the signal level detector.

2. A light measuring apparatus as claimed in claim 1, wherein said signal level detector detects the levels of the n elongated electric signals with timings shifted from each other.

3. A light measuring apparatus as claimed in claim 1, further comprising:
    a selector for selecting one from the n elongated electric signals inputted from the n time constant converting circuits and outputting the selected one; and
    a selector controller for causing the selector to perform selection in rotation at given periods,
    wherein said signal level detector detects the level of the elongated electric signal outputted from the selector.

4. A light measuring apparatus as claimed in claim 1, wherein said signal level detector further detects, at least once, the level of an elongated dark electric signal, which is an elongated electric signal when the measuring light is not outputted, and said calculator calculates a deviation resulting from a factor other than the measuring light by using the result of detecting the level of the elongated dark electric signal and calculates the integral values of the n elongated electric signals derived only from the measuring light by using the deviation and the result of detecting the levels of the n elongated electric signals.

5. A light measuring apparatus as claimed in claim 4, wherein said signal level detector detects the level of one of the n elongated dark electric signals and repeatedly performs the detection in rotation at given periods.

6. A light measuring apparatus as claimed in claim 5, wherein said calculator calculates the integral values of the n elongated dark electric signals as the deviations by using the result of detecting the level of the elongated dark electric signal and subtracts, from the integral values of then elongated electric signals, the corresponding deviations.

7. A light measuring apparatus as claimed in claim 1, further comprising:
an amplifier for amplifying the elongated electric signals from the time constant converting circuits.

8. A light measuring apparatus as claimed in claim 7, further comprising:
a changing means for changing the amplification factor of the amplifier based on the result of detection from the signal level detector.

9. A calorimeter having the light measuring apparatus as claimed in claim 1, the colorimeter comprising:
an illumination lamp for outputting a pulse beam for the illumination of a sample under measurement; and
an optical member for dividing a light beam from the sample into n light beams having different characteristics,
wherein said pulse beam outputted from the sample, when the sample is illuminated with the pulse beam from the illuminating lamp, is divided into n beams such that the beams having different spectral characteristics are received as measuring light by the corresponding photometric converting elements.

10. A calorimeter as claimed in claim 9, wherein said calculator calculates color values based on said calculated integral values.

11. A light measuring apparatus comprising:
n (n is an integer equal to or more than 2) photoelectric converting elements for receiving pulse-like measuring light and outputting electric signals responsive to measured light intensities;
n time constant converting circuits provided to correspond to the n photoelectric converting means, the time constant converting circuits outputting elongated electric signals obtained by elongating the electric signals outputted from the photoelectric converting elements in the direction of a time axis;
a signal amplifier having m (m is an integer equal to or more than 2) selectable amplification factors, the signal amplifier outputting n amplified elongated electric signals obtained by amplifying each of the elongated electric signals with the selected one of the amplification factors;
a signal level detector for detecting the levels of the amplified elongated electric signal at different times in the direction of the time axis;
amplification factor setting means for setting a proper amplification factor selected from the m amplification factors based on the result of detection from the signal level detector; and
a calculator for calculating respective integral values of the n amplified elongated electric signals by using the result of detection from the signal level detector.

12. A light measuring apparatus as claimed in claim 11, further comprising:
wherein said signal level detector detects the levels of the n amplified elongated electric signals with timings shifted from each other.

13. A light measuring apparatus as claimed in claim 11, further comprising:
wherein said amplification factor setting means switches the setting of the amplification factor at least once while the n elongated electric signals are outputted.

14. A light measuring apparatus as claimed in claim 11, wherein said signal level detector further detects, at least once, the level of an amplified elongated dark electric signal, which is an amplified elongated electric signal when the measuring light is not outputted, and
said calculating means calculates a deviation resulting from a factor other than the measuring light by using the result of detecting the level of the amplified elongated dark electric signal and calculates the integral values of the n amplified elongated electric signals derived only from the measuring light by using the deviation and the result of detecting the levels of the n amplified elongated electric signals.

15. A calorimeter having the light measuring apparatus as claimed in claim 11, the calorimeter comprising:
an illumination lamp for outputting a pulse beam for the illumination of a sample under measurement; and
an optical member for dividing a light beam from the sample into n light beams having different characteristics,
wherein said pulse beam outputted from the sample, when the sample is illuminated with the pulse beam from the illuminating lamp, is divided into n beams such that the beams having different spectral characteristics are received as measuring light by the corresponding photometric converting elements.

16. A light measuring apparatus comprising:
a first photoelectric converting element for receiving pulse-like measuring light and outputting a first electric signal;
a second photoelectric converting element for receiving the pulse-like measuring light and outputting a second electric signal;
a first time constant converting circuit provided to correspond to the first photoelectric converting element, the first time constant converting circuit outputting a first elongated electric signal obtained by elongating the first electric signal in the direction of a time axis;
a second time constant converting circuit provided to correspond to the second photoelectric converting element, the second time constant converting circuit outputting a second elongated electric signal obtained by elongating the second electric signal in the direction of the time axis; and
a calculation controller for sampling, a plurality of times, each of the first and second elongated electric signals at given time intervals and calculating respective integral values of the first and second elongated electric signals by using plural sets of sampling data.

17. A light measuring apparatus as claimed in claim 16, further comprising:

a selector for selecting one from the first elongated electric signal and the second elongated electric signal and inputting the selected one to said calculation controller.

18. A light measuring apparatus as claimed in claim 17, further comprising:

an amplifier for amplifying the first or second elongated electric signal, wherein said calculation controller changes the amplification factor of the amplifier.

19. A calorimeter having the light measuring apparatus as claimed in claim 16, the calorimeter comprising:

an illumination lamp for outputting a pulse beam for the illumination of a sample under measurement; and an optical member for dividing a light beam from the sample into n light beams having different characteristics.

* * * * *